United States Patent [19]

Turner et al.

[11] 4,175,855

[45] Nov. 27, 1979

[54] ELECTRONIC EXPOSURE CONTROL

[75] Inventors: William C. Turner, Northridge; William R. Limburg, Torrance; John S. Burton, Los Angeles, all of Calif.

[73] Assignee: Terminal Data Corporation, Woodland Hills, Calif.

[21] Appl. No.: 650,642

[22] Filed: Jan. 20, 1976

Related U.S. Application Data

[63] Continuation of Ser. No. 458,167, Apr. 4, 1974, abandoned.

[51] Int. Cl.² .................. G03B 27/74; G03B 27/78
[52] U.S. Cl. ................................ 355/68; 355/71; 355/77
[58] Field of Search ............... 355/67, 68, 71, 77; 354/24, 43, 50, 51; 340/173

[56] References Cited

U.S. PATENT DOCUMENTS

| 3,426,357 | 2/1969 | Paulus | 355/68 |
|---|---|---|---|
| 3,512,140 | 5/1970 | Yokozawa et al. | 340/173 |
| 3,544,214 | 12/1970 | Edgar | 355/68 |
| 3,679,905 | 7/1972 | Watanabe | 354/24 |
| 3,732,011 | 5/1973 | Hansard | 355/68 |
| 3,734,611 | 5/1973 | Knapp et al. | 355/68 |
| 3,746,446 | 7/1973 | Sliwkowski | 355/68 |
| 3,795,444 | 3/1974 | Glidden et al. | 355/68 |
| 3,795,445 | 3/1974 | Hamlin et al. | 355/68 |

Primary Examiner—Russell E. Adams
Attorney, Agent, or Firm—Harry R. Lubcke

[57] ABSTRACT

A photographic exposure control for sensing and electrically processing illumination reflected from a moving document. An opto-photoelectric pickup accepts reflected illumination having a selected spectral characteristic. Electronic analog logic; (1) samples and holds the equivalent electrical magnitude of the reflected illumination, (2) provides an electrical timing interval that is the reciprocal of the electrical magnitude, (3) arranges automatically for constant exposure of the film through an adjustable electrical ramp generator, and (4) generates an "exposure stop" signal in a comparator that receives the ramp and the reciprocal timing information. The control signal thereby formulated typically accurately actuates a translational type shutter through a stepper motor to maintain a constant density of the background of images on microfilm for successive documents regardless of the background reflectivity thereof. A "Manual" mode is alternately available for providing a fixed exposure, particularly for documents having unorthodox reflectivity formats.

15 Claims, 4 Drawing Figures

ELECTRONIC EXPOSURE CONTROL

This is a continuation of application, Ser. No. 458,167, filed Apr. 4, 1974 now abandoned.

BACKGROUND OF THE INVENTION

This invention relates to photography, in which a photocell controls exposure time or aperture, or both.

The prior art has included various devices based on the original concept of a photo-voltaic cell exposed to the illumination of a whole scene to be photographed and which actuates a meter movement. The latter either gives an indication to an operator, or actuates an iris diaphram in the optical path of the lens to adjust the effective exposure to the illumination reflected from the scene.

Subsequent devices have employed electronic circuits between the sensor of illumination and the controlled optical element. This has allowed particular laws of control to be impressed upon the control function, such as logarithmic; also, combination with other electrically represented parameters; also, variation of the laws of control by relatively automatic means.

The methods and means for accomplishing electronic control have been varied. Some have employed an oscillator, the frequency of which is varied by the control parameters. Electronic counters have also been used. Also, delay circuits with the delay dependent upon the control parameters. A bridge circuit has often been employed for the photo-responsive element. Analog type circuitry has been usual, but digital type circuitry has been proposed.

Certain still cameras employ one photo-sensor directly viewing the total field of view, with another one viewing the same through the typically stopped-down lens. The two responses are combined for exposure control purposes. Also, one photo-sensor may be restricted to view only the central portion of the field of view; i.e., the object of principal interest.

BRIEF SUMMARY OF THE INVENTION

Photo-sensor and electronic means are provided to implement the method of determining the correct exposure conditions for successive relatively rapidly moving documents on their way to an exposure station. The exposure of the film is based on the measurement of the background reflectivity of a document; i.e., the region surrounding the printed matter that contains the intelligence to be recorded. The system is capable of functioning within a time interval measured in milli-seconds.

A sample and hold circuit is employed to accept the photo-sensor output as a document passes, to make it later available to the rest of the exposure apparatus. A reciprocal-function computing element is employed to convert the illumination information to the required shutter-open time interval. Obviously, the brighter the illumination is the shorter the shutter-open time may be.

An electronic voltage ramp generator and a voltage comparator effect cognition of the required shutter timing interval for each document. A "close shutter" command occurs at the end of the required pause time.

Since the invention is primarily intended to accomplish satisfactory exposure of very high gamma films, such as microfilm stock, the accuracy of control is of the order of one percent. An example concerned with typical multi-image microfilm or microfiche operations requires that the background density of all images be held the same to within plus or minus 0.05 D. For a typical film gamma of 2.9, this requires that the exposure be accurate to within about plus or minus three percent.

An alternate "Manual" mode of functioning is available at the option of the operator. This maintains a fixed exposure interval, based on a held reflectivity value that is obtained from adjustments made during the reflectivity determination of a test sample document. The method and apparatus utilized is otherwise the same as for automatic control.

DESCRIPTION OF THE PREFERRED EMBODIMENTS

Figure 1:
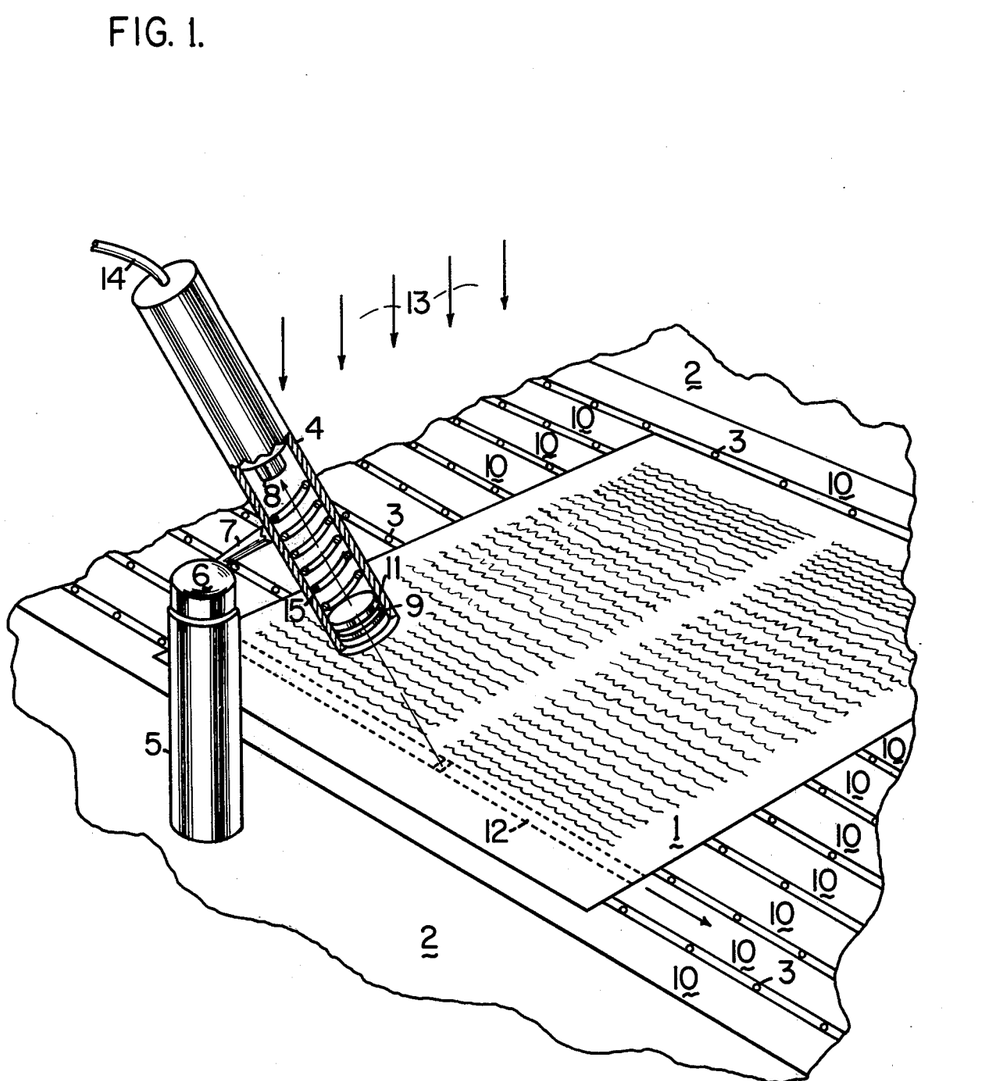
FIG. 1 shows the relation of the photo-sensor and the moving document in a fragmentary perspective view of a microfiche camera transport machine.

In FIG. 1, document 1 is typically moving from left to right rather rapidly, perhaps to 100 inches per second; this being the item upon which a reflectivity reading is required for operation of the exposure control of this invention.

The document transport mechanism may be according to the U.S. patent application, Ser. No. 405,354, filed Oct. 11, 1973, which includes co-inventor John S. Burton.

Briefly, a multiple belt 10, of fabric, travels at the speed required from left to right. This is accomplished by means of pulleys and drive mechanisms shown in the above-referred-to patent application. The belts travel over a stationary table 2, which is provided with a lower plenum and a vacuum connection. Holes 3 between the belts 10 provide a down-rush of air with which to hold document 1 to belts 10 as the belts carry the document past sensor telescope 4.

Telescope 4 may be mounted upon table 2 by means of column 5, which is attached thereto. The column has a socket at the top and a ball arm 7 which fits therein and is attached to the telescope tube at approximately the middle of its length. The principal function of the telescope is to contain photo-sensor 8 and an optical system comprised of filter 9 and converging lens 11. Optical filter 9 is typically a long wavelength visible and infra-red cut-off filter; i.e., a short wave pass filter. It may be of the inteference type, typically passing only the blue and green regions of the visible spectrum.

Converging lens 11 may be of only moderate optical quality. It is employed to accomplish an approximate two-to-one magnification of the sensitive area of the photo-sensor 8 to the area scanned on document 1.

Photo-sensor 8 may be a silicon photo-voltaic cell or an equivalent semiconductor photodiode having a maximum response in the green spectral region, such as the "green-responsive cell" available from the Sensor Technology Co. in a TO5 semiconductor container can. The known vacuum photomultiplier may also be used. The requirement is linearity of the output voltage or current as a function of incoming light flux. Good linearity contributes to the improved accuracy of exposure control, such as is required for high gamma negative film, and is attained according to this invention, as will be made further evident later.

The spectral response of the combined filter 9 and cell 8 is arranged to be approximately that of the film used in the camera that photographs the document, such as the Kodak AHU microfilm film.

A light baffle consisting of a coil spring 15 coated with flat black paint is inserted between the lens and the photocell. This prevents spurious reflections from the interior sidewall of housing 14 and thus restricts the field of view to the desired small area along path 12.

The portion of the document that is surveyed by the telescope may be varied depending upon the specific application. However, a rectangular area 0.4 inch transverse to the direction of motion of the document and 0.2 inch in that direction is suitable. This results in a "swath" or path 12 along the moving document when its passage has been completed. This path is typically arranged to be one inch or less from the edge of the document by suitably orienting the telescope. This is possible because of the ball and socket arrangement 6, 7. Path 12 does not actually exist on the document, but it has been shown dotted in FIG. 1 to enhance comprehension of the invention.

Document 1 typically includes a page of printing, or equivalent marks. However, near the edge of the paper a clear border invariably exists, at least over the greater part of the length of the edge. This allows significant and typically broad peaks of maximum reflectivity to be obtained by telescope 4, such as is shown in the upper part of waveform "A" in FIG. 4.

According to photographic theory, exposure equals light intensity multiplied by time, or $E = I \times t$. In the practice of this invention the exposure of the image background is desired to be a constant.

Thus, $t = E/I$ and $t = \text{constant}/I$.

In other words, time that the exposing shutter is open must be the reciprocal of the light intensity. This is accomplished by the electronics of FIG. 2.

Figure 2:
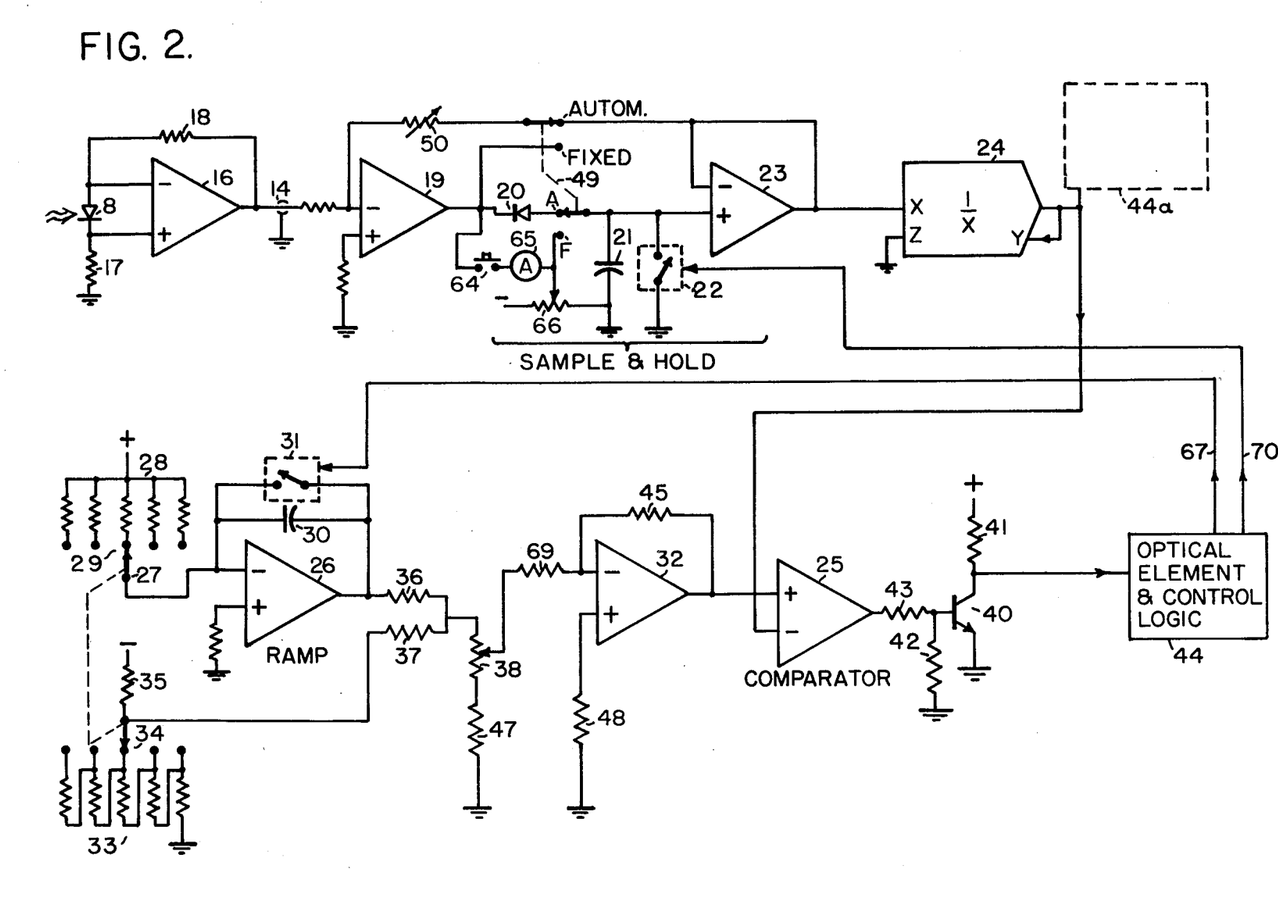
FIG. 2 is a schematic diagram of the electronic analog computer portion of the exposure control apparatus.

The upper part of telescope 4 in FIG. 1 contains an impedance-reducing photo-sensor pre-amplifier that is schematically shown as 16 in FIG. 2. The somewhat rapidly changing signal response is thereby conveyed at low electrical impedance to the rest of the electronic circuit, located elsewhere, through signal cable 14, typically of the coaxial type.

In FIG. 2 photo-sensor 8 is shown as a photo-diode connected to pre-amplifier 16. The latter may be the 8007 FET input integrated circuit type. This amplifier is operated at high transconductance gain by suitable selection of resistors 17 and 18 that are conducted to it. These are matched at 100,000 ohms each and give a voltage output that is approximately 200,000 times the photocurrent; i.e., the voltage output from amplifier 16 through cable 14 is 200,000 times and proportional to the photocurrent through diode 8. Amplifier 16 is operated to present a high input impedance to the photodiode.

Figure 4:
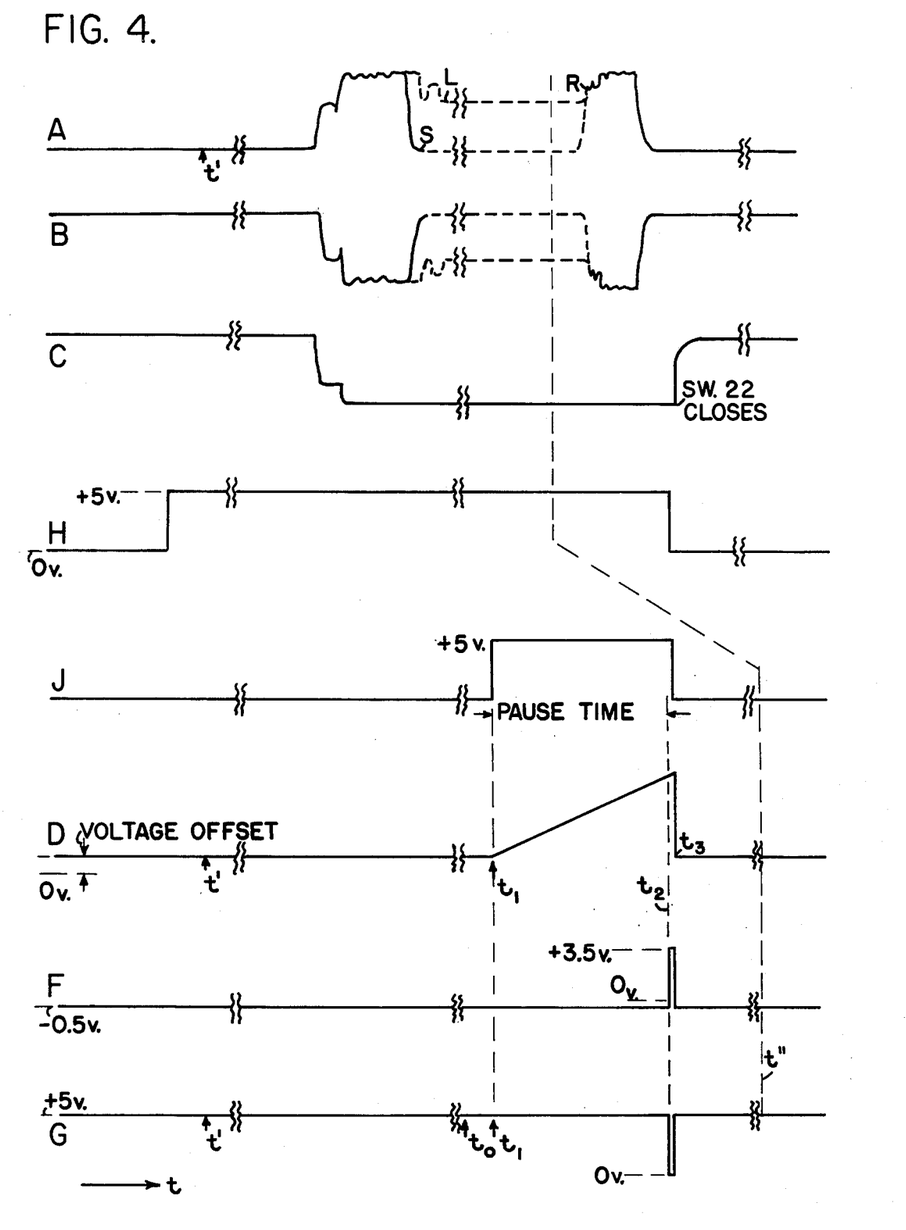
FIG. 4 shows electrical waveforms present at significant points in the circuit of FIG. 2.

The waveform appearing at the output of amplifier 16 is "A" of FIG. 4. It has a positive pulse shape while the document is passing under telescope 4. The minor variations are typically caused by the varying apparent reflectivity of the document as it passes. A less than maximum amplitude step shown at the first part of the pulse may be caused by a photograph or other printed matter on the document extending into the region of path 12. Sharp negative-going spikes may be caused by a printed border. However, the remainder of the circuit stores the peak value of the waveform and such momentary depressions do no impair the operation of the exposure control.

Depending upon the reflectivity of the background of the document, which might vary from 95% down to 20%, the peak amplitude of the voltage pulse of waveform "A" would be in the range of from 0.06 down to 0.005 volts in a representative embodiment.

Buffer amplifier 19 is connected to the output circuit of amplifier 16. The buffer amplifier may also be of the 8007 type and it is arranged to have a gain of approximately 150 times. This gives a negative pulse as shown in waveform "B" having an amplitude range of from 8.8 to 0.75 volts peak for the input signals previously postulated.

With a short document the waveforms return to the axis after the document has passed, as at "S". For long documents, as legal size, and orientation in the transport mechanism the long dimension in the direction of movement, the document may still be under a part of telescope 4 while it is at rest. In such a circumstance the pulse waveform does not return to the axis, but remains at an amplitude "L". A shortened repeat of the pulse occurs at "R" when the document returns form the photographing station, typically to be turned over by the transport mechanism. This pulse is not used, since the photographing has already been accomplished. These conditions are for a typical transport mechanism and are illustrative, but not exclusive in the use of the exposure control.

The output of buffer amplifier 19 is connected to the cathode of diode 20 and from there to one terminal of storage capacitor 21, the other terminal thereof being connected to the circuit ground. This capacitor is preferably of low leakage, such as a metalized polycarbonate type, and preferably has a capacitance of 2 microfarads.

Solid state switch 22, of the FET type, is closed to hold capacitor 21 in a discharged state at all times except immediately prior to the arrival of the document under the telescope, at time t' in FIG. 4. At this time switch 22 opens, allowing the capacitor to quickly charge to the instantaneous value of the input signal. This precludes the storage of interference noise pulses or spikes, such as might be picked-up in cable 14 at times other than when a document is present. Diode 20 prevents the capacitor 21 from discharging back through amplifier 19 during periods of lower voltage input, thus implementing he peak detector/hold circuit.

In typical operation, document 1 passes beyond the range of telescope 4 and to a photographing station (not shown), where it is brought to rest by belts 10 and the photographing is accomplished by a camera (not shown). The voltage stored upon capacitor 21 represents the true background brightness of the document viewed, based upon a measurement of the brightest area along path 12. This is shown in waveform "C" of FIG. 4.

This peak voltage is carried from the capacitor by voltage-follower buffer amplifier 23 for subsequent electronic processing. This may also be a type 8007, and it is arranged to have a gain of unity. Thus arranged the input impedance is very high; i.e., greater than 100 megohms. This precludes discharging capacitor 21 appreciably with respect to the 1% overall accuracy desired of this exposure control.

The output from amplifier 23 enters an input terminal of "reciprocator", or inverse calculator, 24, which is implemented with a multiplier integrated circuit, such as the AD530K, or possibly the AD532K, type. The function of this device is to provide "1/X" of the input voltage. The AD530K, typically a "multiplier" integrated circuit, has been converted into an analog reciprocal calculator by connecting the output directly to the "Y" input, grounding the "Z" input, and applying the signal voltage (corresponding to the reflectivity of the document) to the "X" input.

In the range of reflectivities previously set forth, an input of $-7.5$ volts represents a high reflectivity. A correspondingly short exposure time is thus required. The reciprocal provided is $+0.66$ volt. The output device is of opposite polarity to the input due to the manner in which these integrated circuits function, but this is of no consequence. For 50% reflectivity the voltage on capacitor 21 is, for the same example, $-3.75$ volts and the output of the reciprocator is approximately $+1.33$ volts. For 20% reflectivity the capacitor voltage is $-1.5$ volts and the output of the reciprocator is $+3.33$ volts.

The reciprocator thus supplies a voltage magnitude that is inversely proportional to the intensity of the illumination reflected from the document. This is the primary magnitude required to effect uniform exposure of film by controlling the exposure time. In a typical embodiment herein this magnitude is converted to a "pause time" interval, for controlling the full open time of a shutter.

The output of reciprocator 24 is connected to one input of voltage comparator 25, which may be a type 710 integrated circuit. The other input thereto is provided by ramp generator 26, which may be a type 8007. The voltage comparator "transitions"; i.e., gives a positive-going output voltage step, when the ramp voltage equals the reciprocator voltage output. This provides the "close shutter" pulse command.

The external connections made to ramp generator 26 are those of an integrator circuit. It is provided with a constant current at terminal 27, arranged by a zener diode power supply and the resistance value selected from the multiple resistor group 28 by the operator by means of single-pole multiple-contact switch 29. This is the "exposure index" range switch. It determines the rate of fall of the ramp waveform and is adjusted to accommodate the photographic "speed" of the film used.

Typically, group 28 may consist of five resistors having individual resistances within the range of from 23,000 to 200,000 ohms, a 16 to 1 range. This group, in combination with two-to-one vernier potentiometer 38, provides an exposure range of 32 to 1. With a 5 to 1 range of measurable reflectivities, from 20% to 100%, of light from the documents, the overall possible exposure time range is 160 to 1.

To perform the integrating function for ramp generator 26, capacitor 30, typically of 2 microfarads capacitance and low leakage, such as the metalized polycarbonate type, is connected from the input to the output thereof. This capacitor is shunted by a single-pole switch 31, which may be of the solid state FET type. This switch enables the ramp generator to function when it is open and not to function when it is closed. It is opened by the "enable" control signal coming from the shutter control logic on line 47. The FET has low current leakage.

The waveform of the ramp function is downward-negative out of amplifier 26. Inverting amplifier 32, connected to that output, inverts this waveform and provides moderate amplification, as 3.3 times, giving waveform "D" of FIG. 4, in which the ramp function is increasing in a positive direction with time. This is the second input to voltage comparator 25.

A second group of resistors 33, ranging in value from 71 to 700 ohms, is arranged in connection with single-pole multiple-contact switch 34, and a source of fixed voltage $-V$ of say 5.6 volts negative through resistor 35. This provides a small negative "offset" voltage for the ramp waveform. Switches 29 and 34 are mechanically ganged, so that operation of a common knob actuates them both. Note the dotted line joning both switch blades in FIG. 2. The purpose of this second group of resistors and associated circuit is to provide means to insert the analog equivalent of the minimum exposure time entailed in opening and closing the shutter.

The resistors in group 33 are individually oppositely arranged in resistance value with respect to those in group 28. Resistor 35 is included, and with a value of 22,000 ohms, to give a proper, small value of the offset voltages typically required because the shutter opening time is small compared to the total possible running time of the ramp. As to the resistors in groups 28 and 33, when the ganged switches are on contact "1", switch 29 is in contact with the lowest value resistor in group 28, while switch 34 is in contact with the highest value resistor in group 33.

It is required that the voltage offset be equal to a value corresponding to the increment of ramp voltage in the effective time it takes for the shutter to open and close. Thus, as the exposure index becomes larger the increments of ramp voltage associated with the slower climb of the ramp become proportionally less, requiring proportionally less offset voltage to compensate for the shutter opening and closing time. The ramp starts from the incremental voltage rather than from zero voltage. In one shutter embodiment the opening time is approximately 25 milliseconds, with the closing time the same.

The output from ramp generator 26 and the offset voltage group of resistors 33 are combined in a summing network comprised of resistors 36 and 37. These are of matched value and each has a resistance of approximately 9,000 ohms resistance. Previously mentioned potentiometer 38 is connected between the common output of resistors 36 and 37 and through a fixed resistor that may have a value of 20,000 ohms 47 to ground. The slider of the potentiometer connects to one input of inverting amplifier 32 through fixed resistor 69, which may have a resistance of 100,000 ohms. With a total resistance value for the potentiometer of the order of 20,000 $\Omega$ a vernier exposure control over a range of two to one is obtained and coacts with the fixed resistors to give an exposure range of 32 to 1 as has been set forth. Resistor 48 returns the positive input of amplifier 32 to ground.

Feedback resistor 45, from the input to the output of amplifier 32, typically has a resistance of 330,000 ohms. In relation to resistor 69, of 100,000 ohms, this gives a gain of 3.3 for the stage. This magnitude of gain is chosen so that the amplitude scale of the ramp voltage is proper to combine with the expected range of output voltages from reciprocator 24.

In comparator 25, when the positive-going ramp voltage just exceeds that of the reciprocator the comparator output transitions and the output increases from about −0.5 to +3.5 volts.

The base of npn transistor 40, which may be a 2N4401 type, is connected to the output terminal of comparator 25, the emitter is connected to ground, and the collector is connected to a positive voltage supply source. The source may be of 5 volts and the connection thereto is through resistor 41, which may have a resistance of 470 ohms. The base to ground resistor 42 may have a resistance of 1,000 ohms.

The collector of transistor 40 is connected directly to output terminal 43, at which appears output pulse "G" of FIG. 4. This is a negative-going pulse having an amplitude of approximately 5 volts and a short duration, typically of the order of one-half millisecond.

The timing of this pulse is with respect to the prior occurrence of an "exposure control enable", or "start" pulse that is impressed upon solid state switch 31 at time $t_1$, when the shutter is fully open. When the reflectivity of the document is high, the time interval between the "start" and "stop" pulses is short, and vice versa.

In the exemplary embodiment, this interval, for any given reflectivity is selectable by means of ganged switch 29–34 and the vernier potentiometer 38.

Information for unshorting FET switch 22 is derived from logic associated with the general operation of the transport mechanism, via conductor 70 in FIG. 2. Note waveform "C" in FIG. 4.

Operation of the exposure control according to the "manual", or fixed, mode is accomplished by a minor modification of the circuit of FIG. 2 by means of switch 49.

The "autom."-"fixed" ganged double-pole double-throw switch 49 is thrown from the "autom." position used for the previously described functioning to the lower "fixed" position. A sample document, having the clear background of the one or more documents to be given a specified, uniform exposure, is placed under telescope 4. Momentary push-button switch 64, connecting meter 65 in circuit between the adjustable potential provided by potentiometer 66 and the output of amplifier 19, is depressed and the center-zero 0.5–0–0.5 milliammeter 65 is nulled to zero by adjusting the wiper of the potentiometer.

This fixes a potential upon sample and hold circuit 20,21,23 until such time as switch 49 is returned to the automatic position of the potential is readjusted by repeating the meter-null procedure. With the fixed potential existing, the sample document is removed and the succession of documents having the same background reflectivity are run through the transport and microfilming parts of the whole machine for accomplishing this photography.

The upper contacts in FIG. 2 of switch 49 are required to alter the feedback path from the automatic to the manual mode. In the automatic mode it is desirable to have the feedback loop include diode 20, so that amplifier 19 will automatically provide sufficient voltage to compensate for the voltage drop across the diode. Thus, the feedback path is from the output of voltage-follower amplifier 23 to the active input of amplifier 19. The proper gain of amplifier 19 is obtained when the feedback is taken from the top of capacitor 21. However, because of the precision storage nature of this capacitor such a connection cannot be tolerated. Instead, it is made to the output of amplifier 23, which provides the same effective connection, but is isolated from the capacitor.

In the manual mode it is seen that diode 20 is not in the circuit. But the circuit is broken behind it and so the upper switch connection is required to complete the feedback loop for amplifier 19. This loop includes resistor 50. It is shown adjustable and is used to regulate the gain of the whole exposure control to accommodate photodiodes 8 of different sensitivities, should this element have to be replaced in service.

In utilizing the exposure control according to this invention with the optical element 44 being a "forward-expose back-expose" translational shutter, which is typical, it is required that certain electrically represented information be supplied that is related to the functioning of the shutter. This is indicated by the "control logic" designation within element 44 in FIG. 2. One embodiment thereof is shown in FIG. 3.

Figure 3:
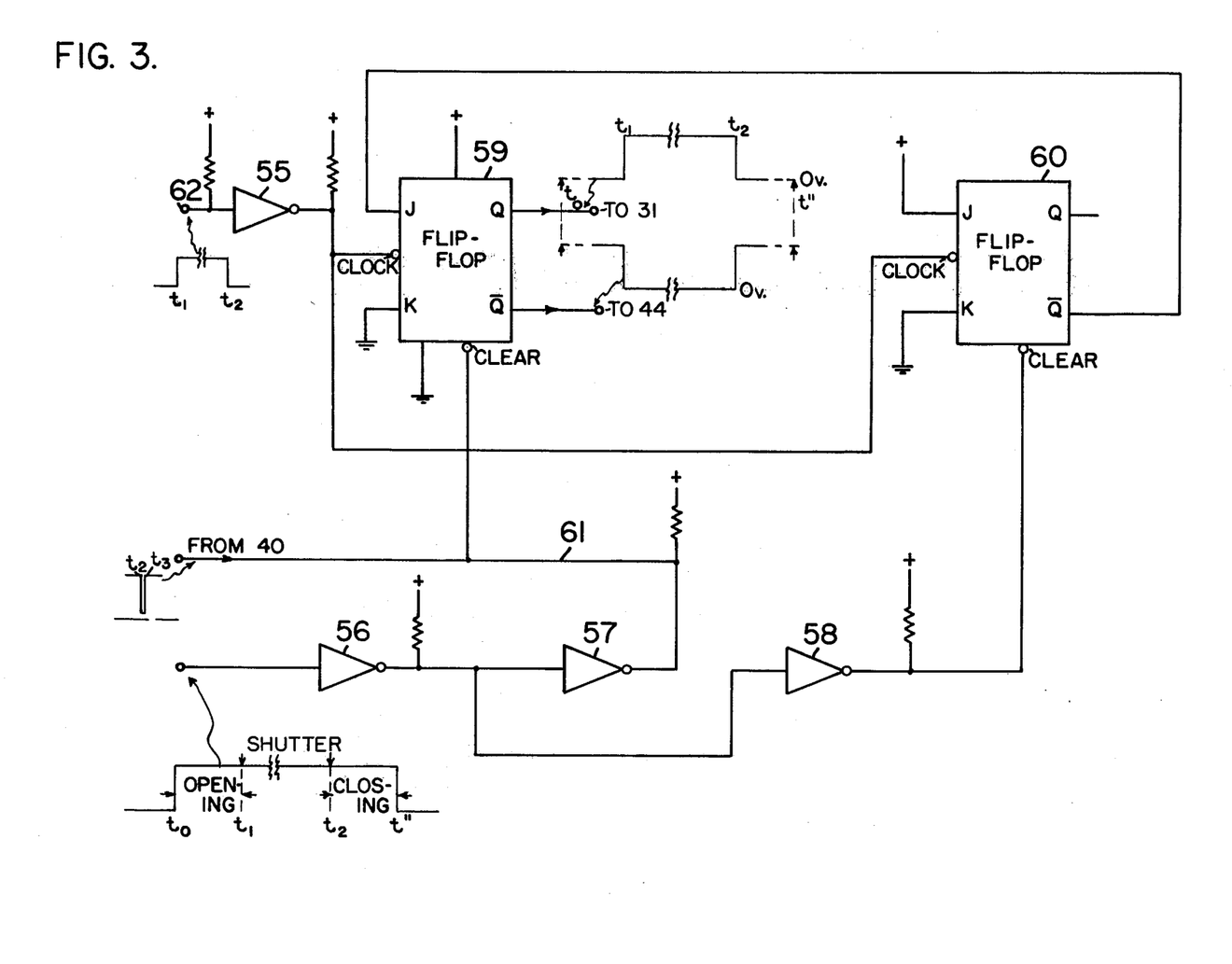
FIG. 3 is a schematic diagram for utilizing the output of the exposure computer to control the movement of a linear bidirectional blade shutter.

FIG. 3 embraces a pair of relaxation devices 59, 60; typically flip-flops, which may be on a 7473 integrated circuit chip. These are interconnected through inverters 55, 56, 57, 58.

At terminal 62 an electrical pulse is received from the shutter mid-position detector (not shown, but understandably an opto-electric device can provide this information). This corresponds to the fully opened position of the shutter. The opening epoch of the shutter has been initiated by a command from the overall process controller, such as by switches 73 and 74 in FIG. 8 of the previously mentioned document transport mechanism patent application, Ser. No. 405,354. The associated logic thereof provides the command when the document to be photographed has arrived at the photographing position and has come to rest.

At time $t_1$, when the shutter has arrived at its fully opened position, a positive transition occurs in the mid-position pulse in waveform "J" of FIG. 4. This produces a negative transition at the output of inverter 55 in FIG. 3. This clocks both flip-flops 59 and 60 at time $t_1$, by a connection to the clock input of each. This takes the J and K inputs of both flip-flops and sets these into the outputs.

Since both flip-flops were cleared when the shutter closed on its prior cycle, the Q outputs of both flip-flops are low. This is prior to time $t_1$. The Q output of flip-flop 59 passes from FIG. 3 via conductor 67 of FIG. 2 to the gate (operating) terminal of FET switch 31 of FIG. 2. Thus, at time $t_1$ flip-flop 59 causes this switch to unshort ramp capacitor 30 and allows the ramp to begin climbing, as indicated in waveform "D" of FIG. 4.

Depending upon the reflectivity of the document, which is related to the output of reciprocator 24, and the control setting 28, which is related to the performance of ramp generator 26, 30, etc., at some point in time the amplitude of the ramp will exceed the voltage output of the reciprocator, at which time voltage comparator 25 will transition. At this time $t_2$ this occurs, as may be noted in FIG. 4.

At this time the collector of transistor 40 of FIG. 2 will go abruptly negative. This means that the output of inverter 56 will go abruptly positive and the outputs of the two inverters 57 and 58 will go abruptly negative. This clears both flip-flops 59 and 60; FIG. 3. At this time the Q output of flip-flop 59 will return to its initial "0" state. This discharges ramp capacitor 30 of FIG. 2, by FET switch 31.

At this time $t_2$, also, the shutter begins to close, and after the time interval required for this to be accomplished, 24 milliseconds, in a representative embodiment, at time $t''$, the shutter will be fully closed. At that time this condition will be sensed by another opto-electric sensor, or an equivalent microswitch, etc., and the input of inverter 56 returns to the negative condition. This sets the whole circuit for the next cycle of operation.

The connection associated with bus 61 cause that conductor to be a wired "OR" gate; which OR's the output of inverter 57 and transistor 40. In other words, flip-flop 59 can be cleared by a negative-going pulse from either transistor 40 of FIG. 2, or from the output of inverter 57.

The method and means of the subject invention are such as to justify calibrated functioning of the parameters controlled. This obtains because of a typical overall accuracy of the control of the order of one percent, in contradistinction to the performance required of the exposure control devices of the usual still camera. The latitude in the exposure of usual photographic black and white or color negative film is relatively very wide as compared to that of high-contrast microfilm. Thus, a relative imprecise control device will function satisfactorily for usual photographic purposes.

Accordingly, one or more Table I tabulations can be calculated and used to obtain information on the adjustment of exposure required to obtain satisfactory exposure in situations where, for some reason, unsatisfactory exposure is experienced. One table is required for each significant change in gamma of the film employed. For usual microfilm a gamma of 2.9 prevails, and Table I has been computed for this value. The equations of the definition of gamma; i.e., density is proportional to the log. of the exposure, and density=$\log_{10}(1/\text{transmission})$ are used.

The headings in the table are self-explanatory.

The "index" is etched upon dials attached to potentiometer 38 for the automatic mode and to potentiometer 66 for the manual (fixed) mode.

In an example of the use of the table, assume that the exposure of some microfilm resulted in a product that was too dark, say a density of 1.5 and that a density of 1.2 was desired. This requires a reduction of 0.3. Enter the first column of the table at "−0.30" and read in the third column the value of 0.795. This is the factor by which the control "index" on the appropriate dial must be multiplied by in order to obtain the new dial setting.

For another example, if a density of 0.9 was being obtained and a density of 1.2 was desired, then enter the table at +0.30 and find the required multiplier in the third column to be 1.258.

In practice the dials may be attached to ten-turn potentiometers for 38 and 66, and an indication for 1/1000 of the whole range of the potentiometer secured.

Element 44a of FIG. 2 may be an iris diaphram or equivalent light attenuation device, which can be controlled from the output of reciprocator 24.

Herein the term "photographic" usually refers to silver halide microfilm or microfiche processing. However, the exposure control of this invention will function with other processes, including xerography.

We claim:

1. The method of photographic exposure control effective upon a moving document (1), which includes the steps of;
   (a) illuminating (13) said moving document,
   (b) forming an electrical magnitude (A, etc.) inversely proportional to the peak reflected value of said illumination and
   having a selected spectral characteristic from a portion (12) of said moving document, and
   (c) controlling the exposure function (G) of an optical element in accordance with said electrical magnitude.

2. The method of claim 1, in which;
   (a) said electrical magnitude is converted into a time interval proportional in duration to the electrical magnitude,
   and is marked by abrupt variations of electrical energy (G).

3. An exposure control system operative on a rapidly moving document, comprising;
   (a) means to illuminate (13) said moving document (1),
   (b) optical means (9,11) to accept reflected said illumination from a selected portion of said moving document,
   (c) photoelectric responsive means (8) to accept said reflected illumination from said optical means and having a selected spectral response to said reflected illumination,
   (d) electronic means (19–24) connected to said photoelectric responsive means to provide an output
   that is related to the peak magnitude of the response of said photoelectric responsive means, and
   (e) an optical element (44) connected to said electronic means and controlled in its performance by the electrical output of said electronic means,
   whereby photographic exposure by said optical element is controlled by the peak magnitude of the selected spectral characteristic of said reflected illumination.

4. The exposure control system of claim 3, in which;
   (a) said optical element is an iris diaphram (44a).

5. The exposure control system of claim 3, in which;
   (a) said electronic means is constituted to provide a said output from the electronic means that is inversely related to the response of said photoelectric responsive means (8).

6. The exposure control system of claim 5, in which;
   (a) said photoelectric responsive means (8) is a semiconductor photodiode, and
   (b) said electronic means includes a reciprocal circuit (24) having a direct feedback connection (Y),
   whereby an accurate reciprocal magnitude of the intensity of said reflected illumination is obtained.

7. The exposure control system of claim 3, which additionally includes;
   (a) electrical ramp means (26) for producing a linear electrical variation with time initiated relative to the start of photographic exposure by said optical element (44), and
   (b) an electrical comparator (25) connected to the output of said electronic means (19–24) and to said electrical ramp means (26)
   for providing an electrical output when the output of said electrical ramp means equals the output of said electronic means,
   whereby exposure information electrically represented in the form of a time interval is supplied to said optical element (44).

8. The exposure control system of claim 7 in which said electrical ramp means additionally includes;
   (a) a first plurality of resistive means (28) selectable to control the rate of buildup of voltage of said ramp, to accommodate selected photographic characteristics.

9. The exposure control system of claim 7 in which said electrical ramp means additionally includes;
   (a) a second plurality of resistive means (33) selectable to add a constant voltage to the voltage of said ramp,
   to accommodate a characteristic of an optical element (44).

10. The exposure control system of claim 7, in which;
   (a) said optical element (44) is a photographic shutter.

11. The exposure control system of claim 10, in which said optical element (44) additionally includes;
   (a) a pair of interconnected relaxation devices (59,60),
   (b) a connection from the output of said electronic means (40) to one of said relaxation devices (59), and
   (c) a connection from said one relaxation device to means for actuating said photographic shutter.

12. The exposure control of claim 3, in which;
   (a) said optical means (9,11) is oriented to cause the selected portion (12) of said moving document to be located near one edge of the document,
   and in view of said orientation the motion of the document traces a band of acceptance of illumination across the document in the direction of motion of the document.

13. The exposure control system of claim 3, in which that part of said electronic means (19-24) that provides an output related to the peak magnitude of the response of said photoelectric responsive means is;
   (a) a sample and hold circuit (20,21,23).

14. The exposure control system of claim 13 in which said sample and hold circuit is composed of;
   (a) a diode (20),
   (b) a storage capacitor (21) connected to said diode,
   (c) a voltage-follower amplifier (23) connected to said storage capacitor, and
   (d) switching means (22) to short said storage capacitor at all times save when an output is obtained from said photoelectric responsive means (8) upon reflection of illumination from a said moving document.

15. The exposure system of claim 13, which additionally includes a manual means for providing a selected exposure comprising;
   (a) a switch (49) connected to said sample and hold circuit,
   (b) adjustable potential means (66), and
   (c) indicating means (65),
   whereby a fixed value of exposure can be set into said exposure control system by matching the adjustable potential to the potential existing at said sample and hold circuit which corresponds to the reflectivity of a selected document.

* * * * *